235-382

12/27/83 XR 4,423,315

SR

United States Patent [19]

Kato et al.

[11] 4,423,315

[45] Dec. 27, 1983

[54] TIME RECORDER

[75] Inventors: Hiroshi Kato, Atsugi; Masanori Numata, Yokohama, both of Japan

[73] Assignee: Amano Corporation, Yokohama, Japan

[21] Appl. No.: 263,087

[22] Filed: May 12, 1981

[30] Foreign Application Priority Data

May 12, 1980 [JP] Japan ..................... 55-62457

[51] Int. Cl.[3] ..................... G06K 1/00

[52] U.S. Cl. ..................... 235/377; 235/378; 235/382; 340/286 R

[58] Field of Search ..................... 346/47, 14, 80; 235/434, 487, 493, 467, 462, 382, 377, 378; 340/286 R

[56] References Cited

U.S. PATENT DOCUMENTS 3,805,026 4/1974 Anders ..................... 235/487
4,021,777 5/1977 Shepard ..................... 340/146.3 AH
4,092,524 5/1978 Moreno ..................... 235/419
4,270,043 5/1981 Baxter et al. ..................... 235/419
4,283,769 8/1981 Asada ..................... 364/710
4,323,771 4/1982 Chalker, Jr. et al. ..................... 235/377
4,333,085 6/1982 Witts ..................... 346/76 PH

OTHER PUBLICATIONS

E. Fabo & E. Höglund, "CTR-Computerized Time Recording", Ericsson Review No. 2, 1980.

*Primary Examiner*—G. Z. Rubinson
*Assistant Examiner*—Robert Lev
*Attorney, Agent, or Firm*—Cushman, Darby & Cushman

[57] ABSTRACT

A working hour system corresponding to each of a number of different kinds of plural work classes is stored in the form of predetermined format in a storage section of a time recorder. A time card has a work class code expressing the work class of the person who owns the card. When the time card is inserted into the time recorder, the time recorder first reads out the work class code recorded on the time, determines the work data related to the time of acceptance of the card by arithmetic operation based on the working hour system in a storage section corresponding to the work class code, and prints the results of this arithmetic operation on the time card.

7 Claims, 8 Drawing Figures

CPU
20
AB
DB
CB
INT
ROM
21
RAM
22
Clock register CK
Personal data memory
F1
F2
Fn
C1
C2
Cn
Transmitting buffer SB
clock circuit
25
Modulator demodulator
40
Key input device
30
Indicating device
32
Interface circuit
31
Interface circuit
27
Card detector
7
Card code reader
9
Card line position detector
11
Card feed motor
5
Original point detector
26
Printer scanning motor
28
Print magnet
29

Control data for each work class

TIME RECORDER

BACKGROUND OF THE INVENTION

This invention relates to a time recorder capable of controlling by a single unit the sophisticated work data even for a place of work where the shift work operations adopting different working hours such as day shift and night shift are being performed.

As is well known, in many conventional ordinary time recorders, a freely sliding card pocket (a slot) is provided in the mechanism of each time recorder. Thus, if a time card is inserted to the card pocket after sliding the pocket to either the "arrival" or "departure" position indicated, the time of day when the card is inserted is printed in either the arrival time column or departure time column of the card. Also, the print line number of the time card is automatically updated every time when the predetermined line switching time elapses in the time records. Also, in some time recorder, regular time start and regular time of end of the work can be preset, and arrival before the regular time of start of work is printed in black color in the arrival time column of the card while an arrival after the regular time of start is printed in red color in the arrival time column in order to distinguish the normal arrival from the late arrival (also the normal departure from early departure). That is, the working hour system containing the time of start and the time end of the work is preset in such equipment, and judgments of normal arrival-departure, coming late-leaving earlier can be made with respect to the acceptance of each time card on the basis of the working hour system, and the results are printed in the time card.

However, though some conventional time recorders are able to preset the working hour system as described above, they can preset with only one kind of working hour system. Thus, if it is required to record the coming late and leaving earlier separately on a card in a place of work where the shift operations are adopted such as early shift from 6:00 to 12:00 and late shift from 12:00 to 20:00 as well as regular shift from 8:00 to 16:00, separate plural time recorders, each preset for a particular working hour system for each shift (work class), must be used.

Also, though the conventional mechanical type time recorder was able to print only the time of arrival and time of departure and to separately print the time of coming late and the time of leaving earlier, more developed type of time recorders seen in recent years have built-in LSI-type data processing equipment such as a microcomputer for performing sophisticated data processing functions in addition to printing the time and distinguishing the coming late and leaving earlier by means of processing of electrical signals. For example, some of the time recorders developed in recent years are able to compute hours of overtime work of early attendance and prolonged attendance by workers, to distinguish the arrival of workers in regular working days from the arrival of workers in nonworking days, to find various kinds of work data such as hours to be deducted in wage calculations by taking account of coming late, leaving earlier and outgoing during working hours, to sequentially print these work data on a time card, to sum and store the work data on a personal file preset for each person in storage (IC memory) in the time recorder, and to electrically process and control the data and system for printing out the tabulated data when necessary.

In these multi-function time recorders stated above, the arithmetic operations for these work data are performed based upon the predetermined working hour system, and this working hour system may include not only the time of start and time of end of work but also nonworking days and early attendance time zones and prolonged attendance time zones required in processing the overtime work.

With respect to these multi-function time recorders, the equipment is very inconvenient if it handles only one kind of working hour system. It is strongly desired that each time recorder is able to preset plural working hour systems and that many workers classified into different work classes (shifts) may need only a single common time recorder.

SUMMARY OF THE INVENTION

The primary object of the present invention is to provide a time recorder capable of automatically printing on a time card the work data of a worker belonging to a particular working hour system without giving any operational burden to the worker in a single time recorder located at a place of work where the plural working hour systems are adopted.

It is another object of the present invention to provide a time recorder capable of automatically printing on a time card the work data of each worker belonging to a particular working hour system, and also of summing and storing these work data.

Another object of the present invention is to provide a time recorder which is simple in construction and can be manufactured economically.

Another object of the present invention is to provide a time recorder capable of printing on a time card the time of acceptance of the time card at the time of arrival at a place of work after automatically separating the status of this arrival time into normal arrival, early arrival for overtime work or late arrival.

Another object of the present invention is to provide a time recorder capable of printing on a time card the time of acceptance of a the card at the time of departure of worker after automatically separating the status of this departure time into normal departure, departure of leaving earlier, or departure after overtime work.

Another object of the present invention is to provide a time recorder capable of automatically establishing an outgoing time zone on the basis of the time of acceptance of a time card and of printing this time zone on this time card.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE INVENTION

Figure 1:
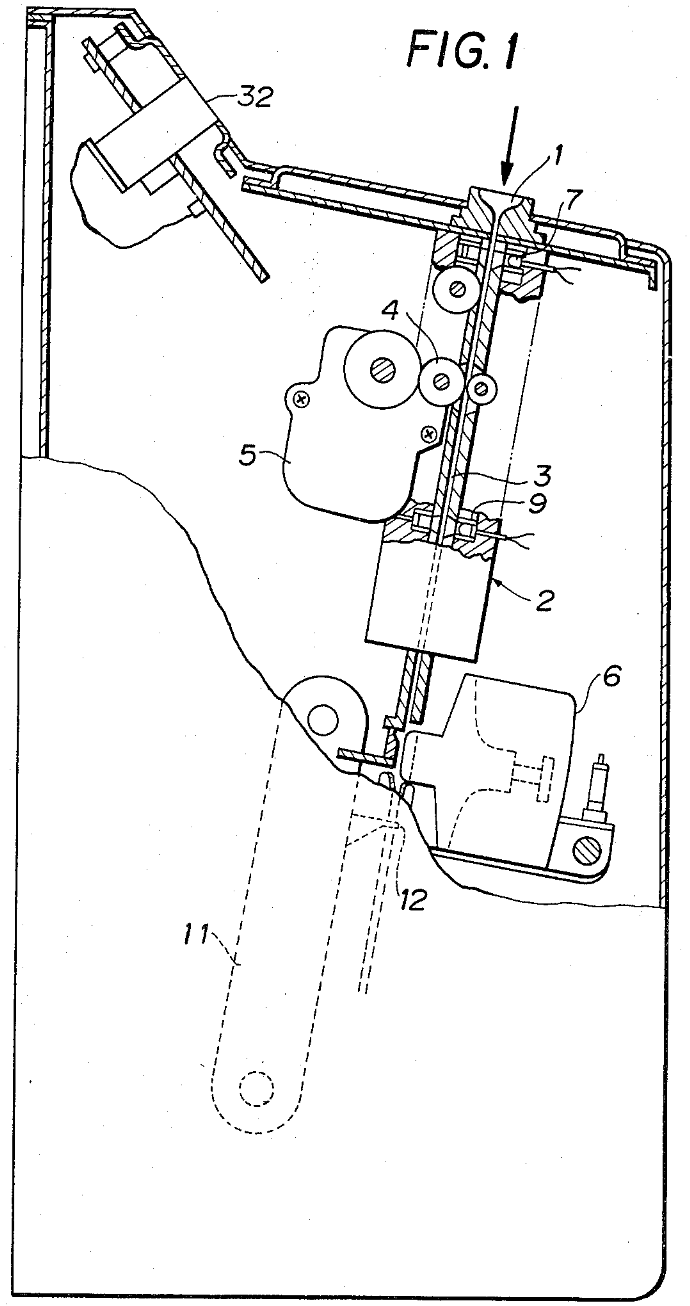
FIG. 1 is a partial section showing the construction of the card insertion assembly and printer assembly of the time recorder, embodying the invention.
Figure 2:
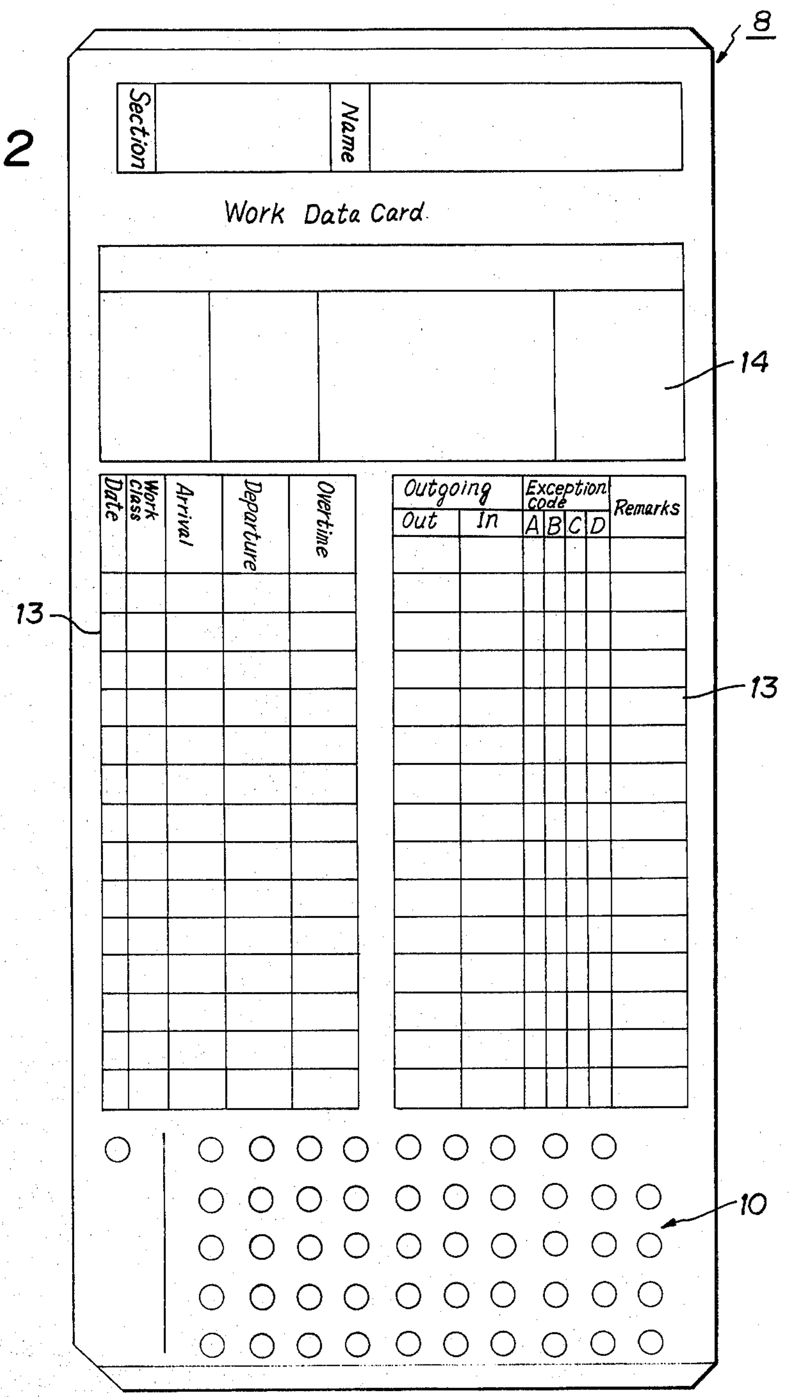
FIG. 2 is a view of a time card to be used for the time recorder of the present invention.

FIG. 1 shows the construction of the card insertion assembly and printer assembly of the time recorder of the present invention. Referring to FIG. 1, a card pocket 1, a card guide 2 having a guide slot 3 continuing to the card pocket 1, a card feed roller 4 driven by a card feed motor 5, and a wire impact type dot printer 6 are indicated. Also, a card detector 7 consisting of a set of light-illuminating and sensing elements oppositely located each other at both sides of the guide slot 3 in the upper portion of the card guide will produce a card detection signal when a time card 8 shown in FIG. 2 is inserted into the card pocket 1 and the light in the gap between the light-illuminating and sensing elements is blocked. A code reader 9 for reading out the personal code recorded in the form of punched on a punch code zone 10 at the bottom of card 8 will consist of plural sets of pairs of light-illuminating and sensing elements located oppositely at both sides of the guide slot 3. A card line position detector 11 for detecting the location of the card 8 with respect to the printer 6 and for determining the location of the print line of the card 8 includes a movable piece 12 capable of moving up and down in contact with the bottom of said card 8 introduced into the guide slot 3 and driven by the card feed motor 5, and a mechanism for detecting the amount of drop of the movable piece 12 from the original point.

As indicated in FIG. 2, a work data printing zone 13 is located and shown in the central portion of the time card 8. This printing zone 13 is divided into many rows by horizontal dividing lines, and each row (or line) is also divided by the vertical dividing lines into the following columns:

| | |
|---|---|
| "Date" | Date print column for printing the date of processing of the time of arrival. |
| "Class" | Work class print column for printing a figure indicating corresponding work class. |
| "Arrival" | Print column for printing the time of arrival. |
| "Departure" | Print column for printing the time of departure. |
| "Overtime" | Print column for printing the hours of overtime work to be handled as early attendance and prolonged attendance to work. |
| "Outgoing, out" | Column for printing the time of going out of a worker during working hours. |
| "Outgoing, in" | Column for printing the time when a worker returned from his temporary absence during working hours. |

-continued

| | |
|---|---|
| "Ex. code" | Exception code print column for indicating various kinds of contents handled such as "coming late", "leaving earlier", "early attendance to work", and "prolonged attendance to work". |
| "Remarks" | Column for printing other data. |

In the code zone 14 of the time card 8, said exception codes and corresponding meaning of codes will be printed in advance.

Also, in punch card zone 10 of the time card 8, both personal code assigned to each card owner and work class code for this card owner are recorded in the form of punched holes in accordance with the predetermined format.

Now, the work classes will be described below in detail. According to this time recorder, plural work classes can be handled, and each work class has its own predetermined working hour system. For example, start of work at 8:00 and end of work at 16:00 can be used for work class (1); start of work at 6:00 and end of work at 12:00 for work class (2); and start of work at 12:00 and end of work at 20:00 for work class (3). In addition to the time of start and the time of end of work, time zones for early attendance and prolonged attendance to work to be handled as overtime work, and also the non working days are predetermined for each work class.

Figure 4:
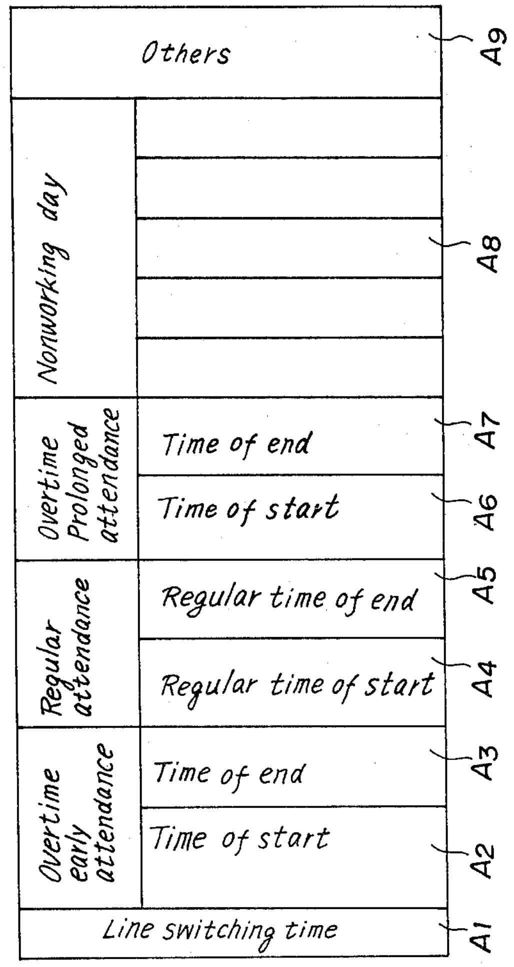
FIG. 4 is a diagram showing the control data to be stored in a control data memory shown in FIG. 3.

In this time recorder, the control data based on the working hour system of each work class are stored in the predetermined memory described later. The configuration of these control data in the memory is shown in FIG. 4. These control data in FIG. 4 are used for a single work class, for which the time of start of work is stored in areas A4 and A5, the early attendance time zone is reserved in areas A2 and A3, the prolonged attendance time zone in areas A6 and A7, nonworking days in area A8, and other set data such as recess time zone in area A9. In area A1, the line switching time (described later in detail) for updating the print line of the time card and the processing data is set, and an intermediate time of day between the time of end of work and the time of start in the following day is generally selected. Thus, these control data are established for each work class, and the work data of each person are processed basing upon these control data.

Also, in this time recorder, predetermined work data are printed in the printing zone 13 of time card 8, work data for each person are stored in the memory of the equipment, and arithmetic operation and storing of results of operation are also performed.

Figure 5:
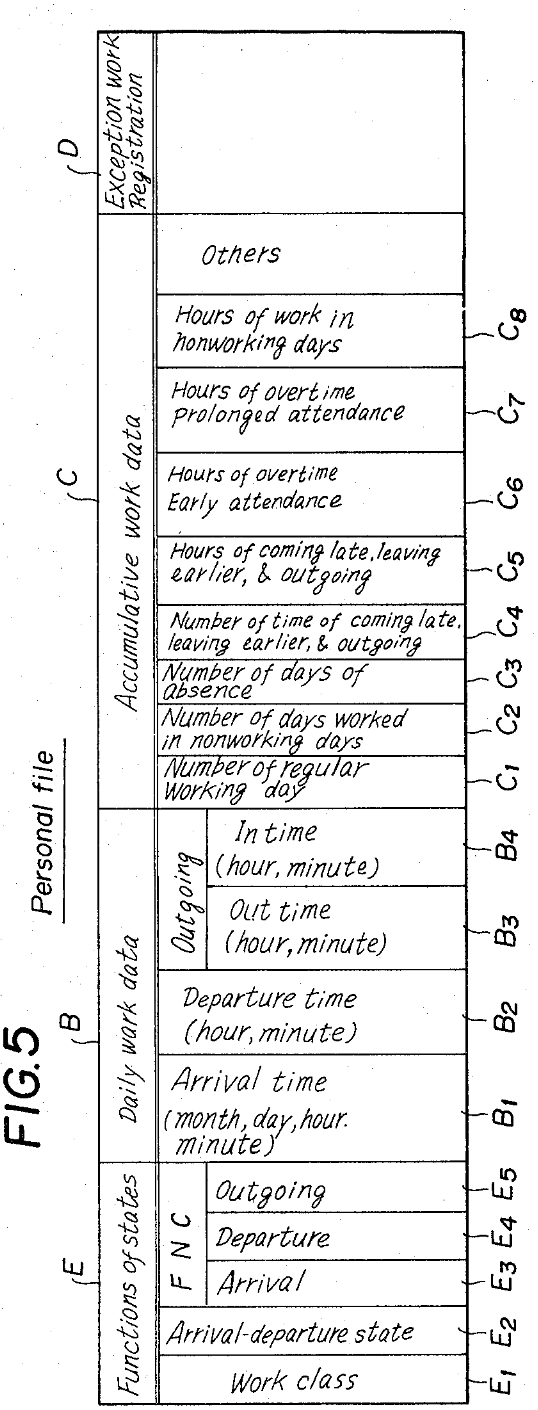
FIG. 5 is a diagram showing the configuration of a personal file to be stored in a file memory 24 shown in FIG. 3.

FIG. 5 shows the configuration of the personal file for storing various kinds of data for each person. As shown in detail in this Figure, the personal file areas B's are the zones for temporarily storing the latest daily work data and, in particular, the time of arrival is stored in B1, the time of departure in B2, the time of outgoing (out) in B3, and the time of outgoing (in) in B4. Also, areas C's are the zones for storing the work data accumulatively calculated, and items of work data stored there are number of regular working days in C1, number of days worked in nonworking days in C2, number of days of absence in C3, number of times in C4 and number of hours in C5 of coming late, leaving earlier, and outgoing, hours of overtime early attendance in C6, hours of overtime prolonged attendance in C7, and hours of work in nonworking days in C8 as shown in FIG. 5. Also, areas D's for personal files are used as registration data areas for registering the items related to exception work such as overtime early attendance and prolonged attendance if they are required.

Areas E's for the personal code store various kinds of state code and function codes related to the data processing for each person. E1 stores work class code read out from time card 8 (this is called work class register). E2 stores either one of four state code of "arrival queuing," "departure queuing", "outgoing-out" (this area is called arrival-departure register). The discrimination of arrival-departure that determines which of arrival, departure, outgoing-out and outgoing-in is specially related to a particular card inserted, will be performed on the basis of this arrival-departure state register E2. Also, E3 stores the function code related to a decision made with respect to coming late to work, early arrival for overtime work or coming to work in a nonworking day; E4 stores the function code related to a decision made with respect to leaving earlier or leaving late after overtime work; and E5 stores the function code related to a decision made with respect to the outgoing for a private purpose or business purpose.

Figure 3:
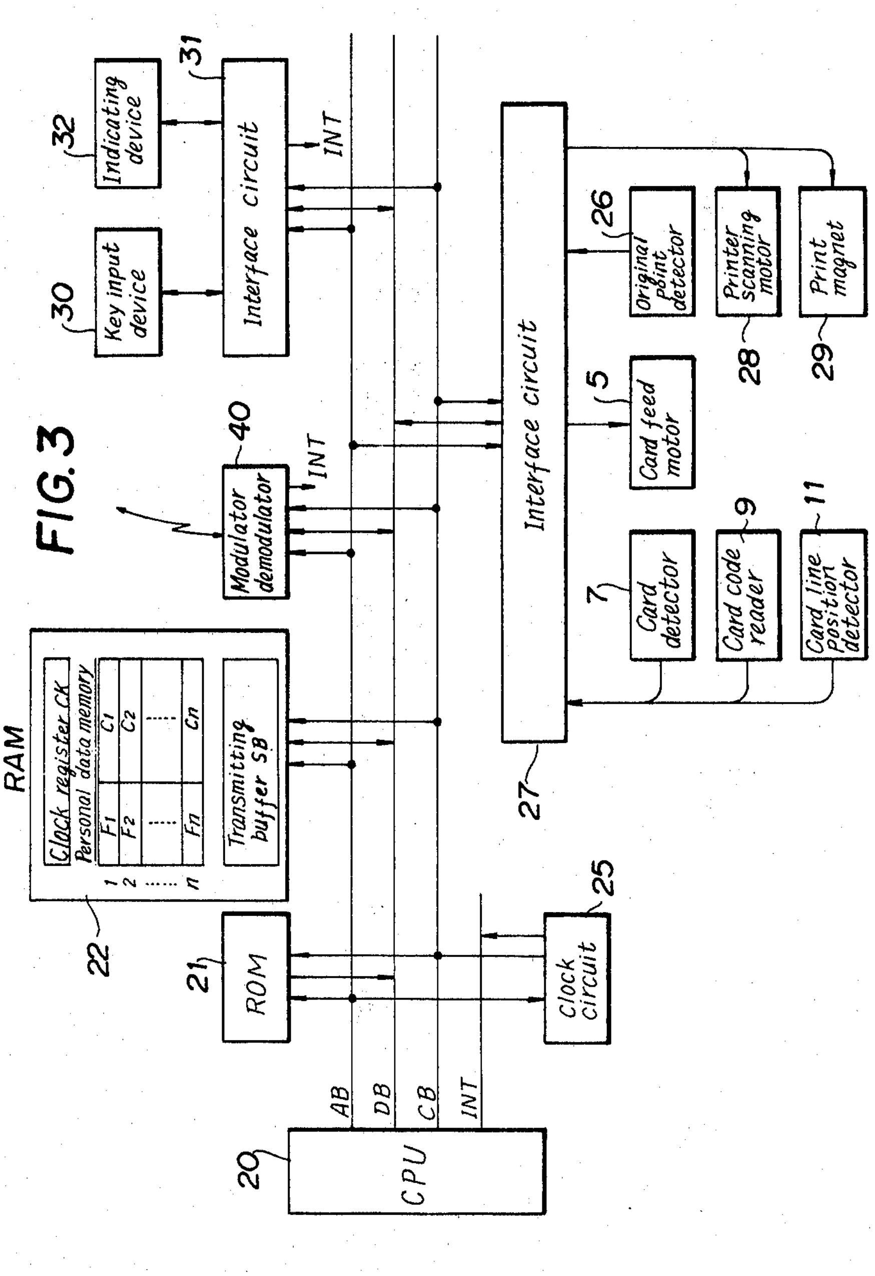
FIG. 3 is a block diagram showing the electrical configuration of the time recorder of the present invention.

Now, the electrical configuration of the time recorder of this invention will be described hereinafter by referring to the block diagram of FIG. 3. This time recorder mainly consists of a so-called microcomputer including a central processing unit 20 (this is a so-called microprocessor and abbreviated as CPU 20 hereinafter), its address bus AB, data bus DB, control bus CB, and interruption signal line INT.

Four different kinds of memories of a program memory 21, a working memory 22, a control data memory 23, and a file memory 24 are connected to the CPU 20. The program memory 21 is used exclusively for read-out and stores the system program prescribing the operation of CPU 20. The working memory 22 function as a memory for both read and write (RAM), and is used as a temporary storage area for various kinds of data needed for the operation of CPU 20. The control data memory 23 in also a RAM, and stores the control data for each class shown in FIG. 4. The file memory 24 is also a RAM, and stores the personal file for each person indicated in FIG. 5.

Clock circuit 25 comprises an oscillator for generating a reference signal for time processing, including a counter and so forth, and applies a pulse signal with a 1-minute period (this is the so called "1-minute pulse") as an interruption signal to the CPU 20, CPU 20 stores the period of time service interruption of its main power source, and is capable of reading the period of time of this service interruption after the recovery from the power failure.

Each signal detected at a detector 26 for detecting the returning to the original point of said card detector 7, card code reader 9, card line position detector 11, and the head of printer 6 can be read out by the CPU 20 through an interface circuit 27. Card feed motor 5, a motor 28 for scanning the head of the printer 6 in the direction of width of time card 8, and a print magnet 29 for driving the dot wires of the printer 6 are all controlled through the interface circuit 27 by the CPU 20.

Also, a proper key input device 30 is connected through an interface circuit 31 to the CPU 20. By using this key input device 30, it is possible to switch the operation modes of CPU 20 and to apply certain data to the CPU 20, such as setting desired data in the control data memory 23, registering the exception work such as outgoing and overtime work, and printing out the summed data of the file memory 24. In addition, an indicating device 32 connected through the interface circuit 31 to the CPU 20 includes the segment indicators capable of indicating the time (month, day, hour and minute) and lamps for indicating other operation modes.

Now, basing upon the flowcharts shown in FIGS. 7 and 8, the operation of the time recorder of the present invention will be described in detail hereinafter. These flowcharts express part of configuration of the system program stores in the memory 21 for prescribing the operation of CPU 20.

Figure 6:
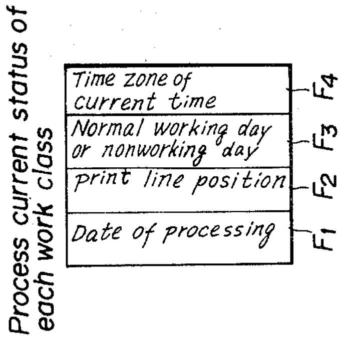
FIG. 6 is a diagram showing the configuration of process current status data created in a working memory 22 shown in FIG. 3.
Figure 7:
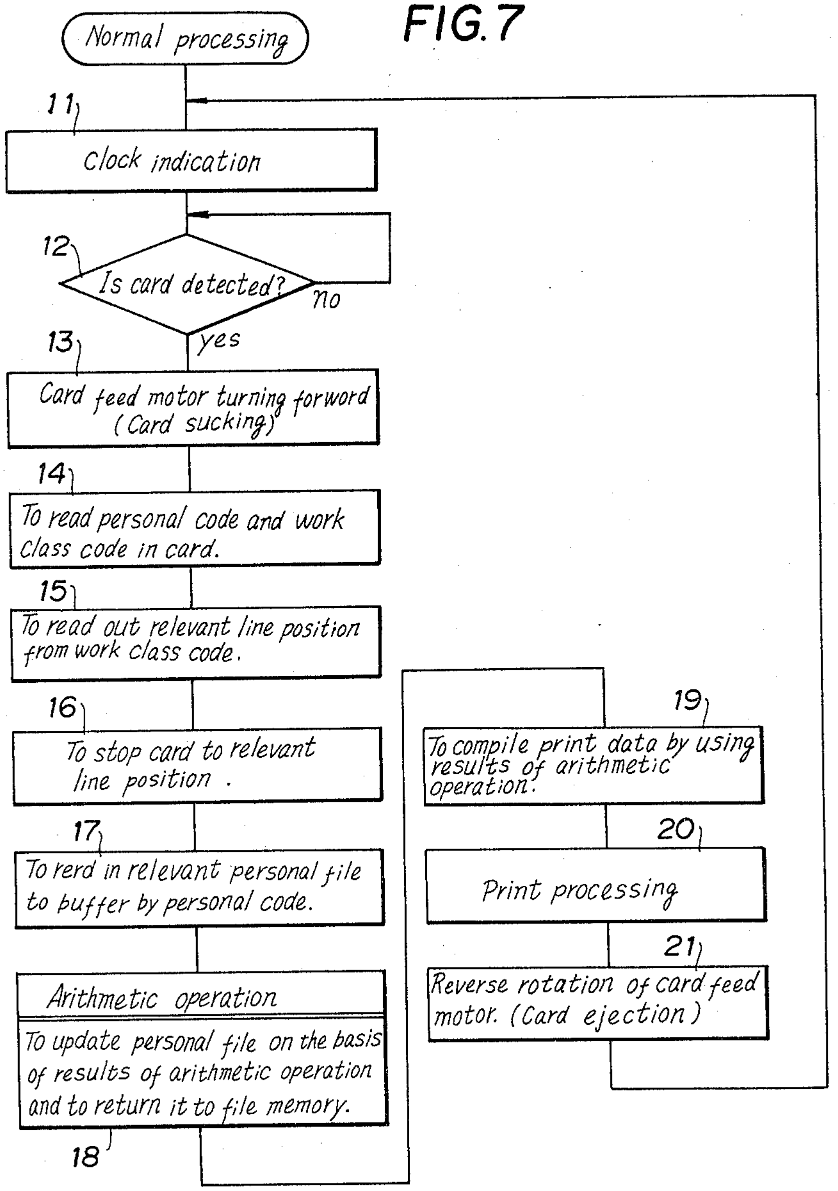
FIG. 7 is a flowchart showing the processing procedure of an ordinary processing routine during the operation of CPU 20 prescribed by a program in a program memory 21 shown in FIG. 3.
Figure 8:
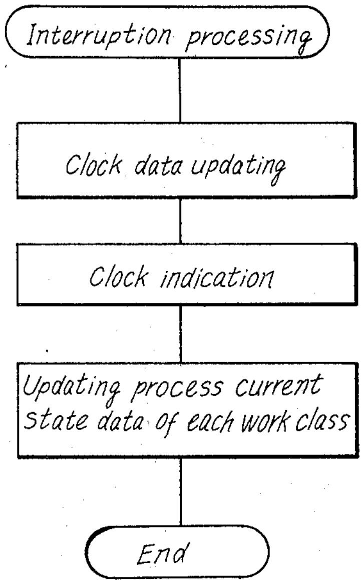
FIG. 8 is a flowchart showing the processing procedure of an interruption processing routine capable of responding to 1-minute pulses of CPU 20.

When 1-minute pulses from the clock circuit 25 are applied to the CPU 20, the interruption processing shown in FIG. 8 is executed. During the first routine (1) of this interruption processing, the clock data are updated. That is, data of month, day hour and minute of the clock register set in the working memory 22 are updated only for one minute. In subsequent routine (2), the updated data in said clock register are supplied to and indicated on the indicating device 32. In the subsequent routine (3), the current time data (month, day, hour and minute) of said clock register and control data for each work class in the control data memory 23 are compared to each other, and the contents of process current status data register set for each work class in the working memory 22 are updated. The configuration (items) of these process current status data is shown in FIG. 6. "Process date" of F1 shown in this Figure is an area for storing the date to be printed in "date" column when the time card 8 belonging to relevant work class at the current time is inserted and, in said routine (3), this process data data F1 is updated when the current time coincides with the line switching time data A1 in the control data. "Print line position" of F2 is an area storing the line number to be printed when the time card 8 belonging to corresponding work class is inserted at the current time and, as above, "1" is added to data F2 of this "print line position" when the line switching time coincides with the current time. In F3 of "non-working or normal working day," data expressing whether an inserted time card belonging to relevant work class at the current time should be processed as arrival for normal working day or arrival for work in a non working day will be stored. The routine (3) will check whether the process date data F1 are set as non-working day in area 8 of the control data, and the results of this checking are stored in this area F3. "Time zone of current time" of F4 is an area for storing the time zone data expressing which of the early arrival time zone, regular time zone and prolonged time zone for overtime work corresponds to the current time of day. The routine (3) compares the current time of day to the data in areas A2 to A7 of the control data, determines the corresponding time zone, and stores the results in area F4. Routine (3) updates the process current status data stated above for each work class and completes the interruption processing, and then the operation will return to ordinary processing routines shown in FIG. 7.

In the routine (11) as the first routine of normal processing shown in FIG. 7, the current time data of said clock register are supplied to indicating device 32. In the subsequent routine (12), the output of said card detector 7 is checked, and whether the time card 8 is inserted to the card pocket is determined. This routine (12) is repeated until the insertion of the time card 8 is detected. When the insertion of the card 8 is detected, the operation progresses to the routine (13) and the card feed motor 5 is started forward. Then, the time card 8 is inserted into the card pocket 1 and is sucked into the guide slot 3 by means of the feed roller 4. In the subsequent routine (14), the output from said card code reader 9 is taken, the card is sucked into the guide slot 3, and then the personal code and work class code are read out from the punch code zone 10 of the card 8 passing through the location of the reader 9.

In the subsequent routine (15), the print line position data F2 are read out from said process current status data (FIG. 6) of the corresponding work class in the working memory 22 in accordance with the work class code read out from the time card 8. In the subsequent routine (16), the output from the card line position detector 11 is checked, the print line position of the time card 8 being pulled inwardly to the guide slot 3 by feed motor 5 is detected sequentially, and then the card feed motor 5 is stopped when the current print line position coincides with the print line position data F2 read out previously. Then, the time card 8 is set, with respect to the printer 6, to a line position corresponding to the print line position data F2 of corresponding work class, and stops.

In the subsequent routine (17), the personal file (FIG. 5) corresponding to the personal code read out from the time card 8 during routine (14) is transferred to the working memory 22.

In the subsequent routine (18), based upon the personal file transferred to the working memory 22, the process current status data F1 to F4 of the corresponding work class, and the current time data of the clock register (the time of acceptance of the time card), various kinds of arithmetic oprations to obtain the required work data are performed, data of predetermined items in the personal file are rewritten using the results of these arithmetic operations, and then these data are returned to the file memory 24.

Now, the principal processing for determining the work data by the routine (18) will be described in detail hereinafter.

(a) When arrival-departure state register E2 of the personal file is checked and is found to be "arrival queuing," the time of acceptance of the card is recognized as arrival time, the process date data F1 in the process current status data of corresponding work class and the current timedata (hour and minute) in the clock register are stored in the arrival time area B1 of the personal file, and the arrival-departure state register E2 is set to "departure queuing". Also, the time zone data F4 at the current time in the process current status data of the corresponding work class are checked, and the data F4 are recognized as coming late if the data are found to be "regular time zone", and then "coming late" code is stored in area E3 of the personal file. Also, if "early arrival" is registered in the exception work registration area D of the personal file and the time zone data F4 at the current time are "early attendance time zone," the arrival is recognized as arrival for early attendance for overtime work, and the "early arrival" code is stored in area E3 of the personal file. Also, the normal working day/nonworking day data F3 in the process current status data of corresponding work class are checked, arrival in nonworking day is recognized if they are found to be "nonworking day", and "arrival in nonworking day" code is stored in area E3 of the personal file.

(b) When the arrival-departure state register E2 of the personal file is "departure queuing," the time of acceptance of the card is recognized as departure time, the current time data is stored in departure time area B2 of the personal file, and the arrival-departure state register E2 is set to "arrival queuing". Also, when the time zone data F4 at the current time in the process current status register of the relevant work class are "regular time zone," the departure is reocgnized as leaving earlier, and "leaving earlier" code is stored in the area E4 of the personal file. Also, when "overtime work" is registered in the exception work register area D of the personal file and also the time zone data F4 at the current time are "overtime work zone", the departure is recognized as departure after overtime work, and "overtime work" code is stored in area E4 of the personal file.

(c) When one day's work data of personal file are obtained after departure of the worker as stated above, the accumulative work data are calculated. Firstly, if area E3 of the personal file is "arrival in nonworking day", the number of days worked in nonworking days in area C2 is increased, and working hours for that day are calculated and added to the working hours in nonworking day of area C8. If area E3 is other than "arrival in nonworking day", the number of regular working days, of area C1 is increased. Also, if area E3 is "coming late", area E4 is "leaving earlier", or area E5 is "outgoing," the number of times of coming late, leaving earlier and outgoing of C4 are increased accordingly, and hours of coming late, leaving earlier and outgoing of that day is calculated and added to the accumulative hours of area C5. It should be noted that the hours of coming late means the result of arrival time B1 of personal file subtracted from the time of start of work A4 of relevant work class and that the hours of leaving earlier means the result of departure time B2 subtracted from the regular time of end of work A5. Also, if area E3 is "early arrival," the hours of early arrival are calculated (the time of arrival B1 of personal file subtracted from the time of end of work of early attendance A3 of relevant work class) and added to the hours of overtime early attendance of area C6. Also, if area E4 is "overtime work," the hours of overtime work are calculated (that is, the result of time of start of overtime work A6 subtracted from departure time B2) and are added to the hours of overtime work of area C7.

The arithmetic operations mainly consisting of (a), (b) and (c) described above are executed in the routine (18) of FIG. 7 and then subsequent routine (19) begins. The description of procedure for the outgoing will be omitted.

In routine (19), the print data to be printed in the printing zone 13 of time card 8 in conformity with the result of arithmetic operation stated above are compiled in the working memory 22. For instance, if the time acceptance of the card is recognized to be a normal arrival by said arithmetic operation routine (18), the month and day data in the arrival time data B1 of the personal file are set as print data corresponding to the date print column of printing zone 13 of time card 8, the data of work class register E1 are set as print data corresponding to the work class print column, the hour and minute data of area B1 are set as print data corresponding to the arrival time print column, but data corresponding to other print columns will not be set (left blank). Also, when a regular arrival is recognized in routine (18), the departure time data of area B2 are set as print data corresponding to the departure time print column, and other remaining data will not be set. In addition, if coming late or early attendance is recognized with respect to the arrival time, a code expressing either coming late or early attendance is additionally set as print data corresponding to the exception code print column. Also, if leaving earlier or prolonged attendance of overtime is recognized at the time of departure, a code expressing leaving ealier or prolonged attendance is additionally set as print data corresponding to the exception code print column and, in case of prolonged attendance or early attendance of overtime, the summed time data of one day's early attendance hours and prolonged attendance hours for overtime work are set as the print data corresponding to the over time work hour print column.

In the subsequent routine (20), the print data compiled in routine (19) are printed by the printer 6 on the predetermined line position of time card 8 which was already set in routine (16). That is, while the printer head is being moved in the width direction of card 8 by driving the printer scanning motor 28, the print magnet is sequentially driven in accordance with the print data and then relevant data are printed in the determined print column in the printing zone 13. Upon completion of printing, the operation progresses to routine (21), the card feed motor 5 is turned reversely to eject the time card 8 from the card pocket 1, and the operation returns to routine (11).

As described hereinbefore, the control data shown in FIG. 4 which consists of working hour system expresses in the form of a predetermined format for each of the different kinds of work classes will be stored in memory 23, and every time when the current time is updated by the 1-minute pulses generated in the clock circuit 25, the process current status data for each work class shown in FIG. 6 are updated based upon said control data. When the time card 8 is inserted, the personal code and class code are read out from this card, various kinds of data related to the time of acceptance of the card are determined basing upon the relevant personal file and the process current status data of relevant work class, and the predetermined items are printed on card 8 and the card is ejected.

However, it may also possible to eliminate the process current status data which are updated and calculated every minute and, instead, said work data may be determined by directly comparing the current time at the acceptance of time card 8 to the control data of relevant work class. Also, the items of work data to be printed on the time card 8 will not be limited to the embodiments shown in the drawings, and other kinds of work data can be naturally adopted as they become necessary.

As apparent from the foregoing description, the time recorder of the present invention is capable of processing and printing the work data based on each working hour system if only a single unit of the time recorder is installed at a place of work where plural work classes of different working hour systems are adopted. In addition, each worker is not required to designate his own work class during daily use of this time recorder, and work data based on the working hour system of his work class can be recorded only by the insertion of his time card.

As many apparently widely different embodiments of this invention may be made without departing from the spirit and scope thereof, it is to be understood that the invention is not limited to the specific embodiments thereof except as defined in the appended claims.

What we claim is:

1. A time recorder comprising:

an assembly for receiving a time card having recorded therein information identifying a specific individual and one of a plurality of working hour systems to which that individual is assigned and a number of lines on which arrival and departure times are to be printed;

means for reading said information on said card and producing signals containing said information;

memory means for storing for each said working hour system the times of starting and stopping for at least regular work hours and for storing for each individual daily and accumulative work data;

computer means for receiving said information containing signal and comparing said signal with the information stored in said memory means to produce a line signal indicating the line to be printed, to produce a print signal indicating the time to be printed at that line and to carry out arithmetical operations to update the stored daily and accumulative work data;

means for producing an output indicating the present time;

means for positioning said card at a predetermined line in response to said line signal; and means for printing said present time at said predetermined line in response to said print signal.

2. A time recorder as in claim 1 wherein said information on said card is stored in the form of punched holes.

3. A time recorder as in claim 1 wherein said computer means compares the working hour system information stored in said memory means with said signal containing said information identifying a work system to produce said line signal.

4. A time recorder as in claim 1 further including means for indicating the present time.

5. A method of time clock recording comprising the steps of:

storing in a computer memory information defining each of a plurality of working hour systems including at least regular starting and stopping times and information for each of a plurality of individuals defining at least daily and accumulative work data;

inserting into an assembly which includes means for receiving a card, positioning that card for printing a given line and printing time information at said given line on said time card having recorded thereon information identifying one of said plurality of individuals and the working hour system to which he is assigned;

reading said card to produce signals containing said information;

comparing the signals thus produced with the stored information and producing a line signal to cause said positioning means to position said card for printing at a given line;

operating a clock to produce a clock signal indicating the present time; and storing the present time.

6. A method as in claim 5 including the further step of detecting insertion of said card into said assembly.

7. A method as in claim 5 further including the steps of:

displaying the present stored time;

maintaining in said memory defining said working hour systems the current data status of each such system; and interrupting the process periodically to update the present time stored and displayed and to update the current data status in said memory in accordance with said present time;

carrying out arithmetical operations to update the stored daily and accumulative work data; and printing the present stored time at said given line on said card.

* * * * *